Patented June 24, 1947

2,422,997

UNITED STATES PATENT OFFICE 2,422,997

PROCESS FOR PREPARING SECONDARY POLYHYDROXYALKYLARYL AMINES

Heinz Moritz Wuest, Upper Montclair, N. J., assignor to Hoffmann-La Roche Inc., Nutley, N. J., a corporation of New Jersey No Drawing. Application December 15, 1944, Serial No. 568,389

8 Claims. (Cl. 260—211)

My invention relates to a new and simple process for making secondary polyhydroxyalkylaryl amines by reacting aldonic acid lactones and primary aromatic amines and simultaneously hydrogenating them.

Secondary amines of the general formula

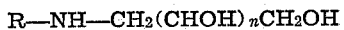

R—NH—CH₂(CHOH)ₙCH₂OH where R stands for an aromatic radical of the benzene or naphthalene series, unsubstituted or substituted, and $n$ means an integer from 2–5 inclusive are useful as intermediates for the synthesis of flavines. Thus, the secondary amine 1,2-dimethyl-4-(D,1'-ribitylamino) benzene and its nitrogen-derivatives in 5-position are employed for the synthesis of the most important flavine, D-riboflavin.

These secondary amines can conveniently be made by known methods provided that the corresponding aldo sugar

CHO—(CHOH)ₙ—CH₂OH is readily accessible, as in the case of D-glucose or D-xylose; the D- sorbityl- and D-xylityl derivatives can be obtained by condensation and simultaneous hydrogenation of the sugar with the aromatic primary amine (Karrer and Meerwein, Helvetica Acta 19, 264, 1936; F. Hoffmann-La Roche & Co., Ltd. British Patent 445,405; Salzberg U. S. P. 2,193,433).

The situation is quite different when the aldo sugar is not easily available and must be synthesized, as in the case of D-ribose which is one of the most expensive sugars. Its extraction from natural sources (yeast, nucleic acids) is difficult and clumsy and its best published synthesis gives less than 9% overall yield in a long and complicated process requiring expensive auxiliary materials. The synthesis of 1,2-dimethyl-4-D-ribitylamino benzene as performed by Karrer and Meerwein was, therefore, not suitable for a technical process.

In most cases the aldonic acids and their lactones are more readily accessible than the corresponding rare sugars. It is, therefore, quite natural that attempts were made to synthesize the desired secondary amines directly from the lactones and without isolating the sugars.

M. Tishler and J. W. Wellman (U. S. Patent 2,261,608) describe a method of synthesizing D-ribityl xylidine from D-ribonolactone. The lactone is converted to ribonamide with ammonia, and the ribonamide is acetylated to the tetraacetyl compound. By splitting off water, the corresponding tetraacetyl ribononitrile is formed which after reductive condensation with xylidine is saponified to D-ribitylxylidine. Starting from ribonolactone the synthesis of these authors requires five steps.

R. Pasternack and E. V. Brown (U. S. Patent 2,237,263) describe another method for preparing ribitylxylidine from ribonolactone. They treat tetraacetylribonamide with N₂O₃ forming tetraacetylribonic acid. The acid chloride prepared by PCl₅ is hydrogenated to tetraacetylribose. This acetylated sugar is condensed with xylidine and hydrogenated. After removing the acetyl groups ribitylxylidine is obtained. Not less than seven different steps are neccessary from the lactone to the desired amine.

Recently Tishler, Wendler, Ladenburg and Wellman published a new method for synthesizing D-ribitylxylidine from D-ribonolactone (J. A. C. S. 66, 1328, 1944). They condense ribonolactone with xylidine to the corresponding xylidide, acetylate the hydroxyl groups and form the chloroimine with PCl₅. This chloroimine is catalytically hydrogenated and the acetyl groups are removed by hydrolysis. Just as in the earlier method of Tishler et al., the synthesis requires five steps.

A direct reduction of sugar acid lactones to the corresponding sugars by catalytic hydrogenation is described by Glattfeld and Schimpf (J. A. C. S. 57, 2204; 1935), using aqueous solution at room temperature, platinum oxide as a catalyst and relatively low pressure. With this method they obtained D-glucose from D-glucono-delta-lactone in a yield of about 80%. The lower homologues, however, do not give the same good yield. The sugars formed are further reduced and the result is a mixture of sugars with sugar alcohols. When D-ribonolactone was hydrogenated according to Glattfeld and Schimpf, no ribose could be obtained and the reduction product was adonitol.

Sugar acid lactones react with aromatic amines to give the corresponding amide (e. g. D-ribonolactone plus xylidine gives D-ribonoxylidide). It is known that acid amides of simple acids can be catalytically hydrogenated to the corresponding amines. The conditions of such a treatment (copper chromite catalyst at 160-180°, Adkins and Wojcik, J. A. C. S. 56, 247 and 2419; 1934. Adkins and Paden, ibid. 58, 2487; 1936) are, however, so drastic that in the case of sugar acid lactones the whole molecule would be destroyed. That compounds like ribonoxylidide cannot be hydrogenated to ribityl-xylidine in solution is obvious from the paper of Tishler et al., (J. A.

C. S. 66, 1329; 1944) in which these authors state:

"Attempts to reduce the amide grouping directly by the catalytic methods employed for the simpler amides were unsuccessful. Under conditions where hydrogenation actually occurred, hydrogenolysis takes place as indicated by the fact that 3,4-dimethylaniline is formed in appreciable amounts."

I have now discovered that polyhydroxyalkyl-aryl amines can be obtained from aldonic acid lactones and aromatic primary amines in a one-step process with good yields if the aldonic acid lactones and the aromatic primary amines are warmed together in solution in the presence of a hydrogenation catalyst under hydrogen pressure. The chemical reaction is illustrated by the following example:

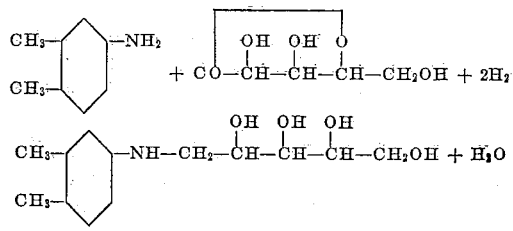

No sugar alcohol is formed during the reaction.

This discovery is highly advantageous for the synthesis of the flavines as it provides for the first time a method of manufacturing polyhydroxyalkylaryl amines from the readily available aldonic acid lactones in a simple one-step process. The lactones are selected from the series of aldonic acid lactones with at least four carbon atoms such as ribono lactone, glucono lactone, xylono lactone, galactono lactone, etc., and the aromatic amines will be those of the general formula R.NH$_2$ in which R is the benzene or naphthalene ring without substituents or with substituents which are non-reactive with the sugar acid lactones under the conditions of the reaction, such as alkyl, alkoxy, hydroxy, carboxy, carbalkoxy groups, for example, phenyl, naphthyl, tolyl, xylyl, methoxyphenyl, hydroxyphenyl, carboxyphenyl, and carbethoxyphenyl. The aromatic amine may be further substituted by a second amino group which is protected against the reaction such as acetamino, carbethoxyamino etc. Instead of the aromatic amine, an aromatic nitro compound can be used; under the conditions of the reaction the nitro compound is reduced to the corresponding amine which then reacts in the way described.

The process is performed in an organic solvent, such as lower alcohols, dioxane or ethylacetate, in which the initial materials are reacted under hydrogen pressure of at least 100 atmospheres and at a temperature below 100° C. in the presence of a noble metal catalyst such as platinum oxide or palladium oxide. It has been found an advantage to carry out the hydrogenation in the presence of alkali such as potassium hydroxide, or a buffer mixture of pH 8–11, although the process can be operated in the absence of these or in the presence of acids. The presence of up to about 10% of water in the reaction mixture was found to be beneficial.

The conditions of the reaction are so chosen that the aldonic acid lactone does not form the amide with the primary amine to an appreciable extent; the formation of the corresponding amide would prohibit the desired formation of the secondary amine.

The following examples illustrate my invention without limiting it.

*Example 1*

A solution of 875 grams of D-ribono lactone in 5 liters of 98% ethanol is mixed with 730 grams of 1,2-dimethyl-4-amino benzene and 150 cc. of normal potassium hydroxide solution added. The mixture is introduced into a glass-lined autoclave and 50 grams of Adams' platinum catalyst mixed with 290 ml. distilled water is added. The mixture is hydrogenated with agitation at 135 atmospheres. The temperature is maintained at below 30° C. for one day and then for a further 24 hours at 75° C. The semi-solid reaction mixture is dissolved by warming with 2 liters of 98% ethanol until the crystals of 1,2-dimethyl-4-D-ribitylamino-benzene are dissolved, whereupon the catalyst is filtered from the hot solution under a stream of carbon dioxide. On cooling the solution is filtered and 860 g. of 1,2-dimethyl-4-D-ribitylamino-benzene are obtained. About 175 grams of xylidine and 85 grams of potassium ribonate can be isolated from the mother liquors. The yield is therefore 61%. M. P. 142° C. $[\alpha]_D^{20} = -30°$.

*Example 2*

22 grams D-ribonolactone and 10 grams 1,2-dimethyl-4-aminobenzene were added to 100 cc. ethanol containing 1.5 grams platinum oxide. A buffer solution (pH 9) was prepared by mixing 50 cc. of 0.5 1 N boric acid solution in 0.1 M KCl with 21.3 cc. of 0.1 N sodium hydroxide. 15 cc. of this mixture was added to the solution to be hydrogenated. After hydrogenating for 3 days at 65° under a pressure of 135 atmospheres, the product was worked up as in Example 1 giving a yield of 43% 1,2-dimethyl-4-D-ribitylaminobenzene. M. P. 142° C. Instead of platinum oxide, 15 grams of 10% palladium charcoal or 5 grams platinum on zirconium oxide may be used as catalyst. A slightly lower yield is obtained in these cases.

*Example 3*

12 grams of D-ribonolactone and 10 grams of 1,2-dimethyl-4-aminobenzene in 10 cc. of 1.2 normal hydrochloric acid and 50 cc. of ethanol were shaken with 0.8 gram Adams' platinum catalyst for 66 hours at room temperature under 115 atmospheres pressure of hydrogen. 1,2-dimethyl-4-D-ribitylaminobenzene was isolated by the method described in Example 1.

*Example 4*

12 grams of D-ribonolactone, 10 grams 1,2-dimethyl-4-aminobenzene and 100 cc. ethanol (or 50 cc. ethanol and 10 cc. water) were shaken with 1–1.7 grams PtO$_2$ for 72 hours at room temperature with hydrogen at 125 atmospheres pressure and then for a further 20 hours at 50° to 78° C. 1,2-dimethyl-4-D-ribitylaminobenzene was obtained in the usual manner.

*Example 5*

24 grams of D-glucono delta lactone and 20 grams of 1,2-dimethyl-4-aminobenzene were added to a solution consisting of 160 cc. ethanol, 8 cc. of water and 5.3 cc. 1 N potassium hydroxide with 2.0 grams platinum oxide. This mixture was hydrogenated for 3 days at 80° under a pressure of 135 atmospheres. The hydrogenated product was a solid gel. This was heated, the platinum filtered, and the solution evaporated to dryness under vacuum. The residue was recrystallized four times from methanol. The melting point of the 1,2-dimethyl-4-D-sorbitylaminobenzene obtained is 134.5°–135.5°.

*Example 6*

44 grams of D-glucono delta lactone and 36.3 grams of p-toluidine were added to a solution consisting of 200 cc. ethanol, 14.5 cc. water and 8.9 cc. 1 N potassium hydroxide together with 2.5 grams of platinum oxide. The mixture was hydrogenated three days at 65° under 165 atmospheres pressure. The platinum was filtered and the filtrate evaporated to dryness in vacuum. The residue was shaken with water and ether. The ether contained 14 grams of p-toluidine. The ether was evaporated to one-half its volume (in vacuum) and the resulting crystals of 1-methyl-4-D-sorbityl-amino-benzene were recrystallized five times from ethanol. M. P. 123° C.

*Example 7*

12 grams of D-ribonolactone and 10 grams of 1,2-dimethyl-4-nitro-benzene were dissolved in 100 cc. ethanol, 3 cc. of n-KOH and 1 gram of platinum oxide were added and the mixture hydrogenated at a pressure of 125 atmospheres for 24 hours. D-ribitylxylidine of melting point 142° was isolated in the usual manner.

*Example 8*

11 grams of D-ribonolactone and 15.3 grams of 1,2 - dimethyl - 4-amino-5-carbethoxyaminobenzene were dissolved in 100 cc. of absolute ethanol. Then 3 cc. of .1 N KOH and 1 gram of $PtO_2$ were added. The bomb was shaken at 30° C. for three days under 140 atmospheres of hydrogen. The bomb was opened and the solid material consisting mainly of 1,2-dimethyl-4-ribityl-amino-5-carbethoxy-amino benzene was filtered off. The filtrate was concentrated in vacuum and then left in the refrigerator overnight when an additional crop of crystals was obtained. The combined crops were first washed with water, then recrystallized twice from alcohol. M. P. 169°.

What I claim is:

1. Process of making a secondary polyhydroxyalkylaryl amine which comprises hydrogenating an aldonic acid lactone and an aromatic primary amine selected from the group consisting of the primary amines of the benzene and naphthalene series and of compounds capable of producing these primary aromatic amines by catalytic hydrogenation, in an organic solvent in the presence of a noble metal catalyst, under a hydrogen pressure of at least 100 atmospheres and temperatures below 100° C.

2. Process of making a secondary polyhydroxyalkylaryl amine which comprises hydrogenating an aldonic acid lactone and an aromatic primary amine selected from the group consisting of the amines of the benzene and naphthalene series containing substituents which are non-reactive with the aldonic acid lactones under the conditions of the reaction, in an organic solvent in the presence of a noble metal catalyst, under a hydrogen pressure of at least 100 atmospheres and at a maximum temperature of 80° C.

3. Process of making a secondary polyhydroxyalkylaryl amine which comprises hydrogenating an aldonic acid lactone and an aromatic primary amine selected from the group consisting of the primary amines of the benzene and naphthalene series, in an organic solvent in the presence of a noble metal catalyst and an alkali under a hydrogen pressure of at least 100 atmospheres and at a maximum temperature of 80° C.

4. Process of making a secondary polyhydroxyalkylaryl amine which comprises hydrogenating an aldonic acid lactone and an aromatic primary amine selected from the group consisting of the primary amines of the benzene and naphthalene series, in an organic solvent in the presence of a noble metal catalyst and an acid, under a hydrogen pressure of at least 100 atmospheres and at a maximum temperature of 80° C.

5. Process of making 1,2-dimethyl-4-D-ribityl-amino-benzene which comprises hydrogenating D-ribono lactone and 1,2-dimethyl-4-aminobenzene in 90% ethanol in the presence of potassium hydroxide and of Adams' platinum catalyst, under a hydrogen pressure of 130 atmospheres and at a temperature not exceeding 80° C.

6. Process of making 1,2-dimethyl-4-D-ribityl-amino-benzene which comprises hydrogenating D-ribono lactone and 1,2-dimethyl-4-aminobenzene in the presence of less than one equivalent of aqueous acid and of Adams' platinum catalyst, under a hydrogen pressure of 130 atmospheres and at a temperature not exceeding 80° C.

7. Process of making 1,2-dimethyl-4-D-ribityl-amino-benzene which comprises hydrogenating D-ribonolactone with 1,2-dimethyl-4-nitro-benzene in an organic solvent in the presence of a noble metal catalyst under a hydrogen pressure of at least 125 atmospheres and at a temperature below 100° C.

8. Process of making 1,2-dimethyl-4-D-ribityl-amino-5-carbethoxy-amino benzene which comprises hydrogenating D-ribonolactone and 1,2-dimethyl-4-amino-5-carbethoxyamino benzene in an organic solvent in the presence of potassium hydroxide and platinum oxide under a hydrogen pressure of 140 atmospheres at room temperature.

HEINZ MORITZ WUEST.

REFERENCES CITED

The following references are of record in the file of this patent:

UNITED STATES PATENTS

| Number | Name | Date |
|---|---|---|
| 1,901,565 | Pasternack et al. | Mar. 15, 1933 |
| 2,223,303 | Lazier | Nov. 26, 1940 |
| 2,166,971 | Schmidt et al. | July 25, 1939 |